US009099148B2

(12) United States Patent
Manes et al.

(10) Patent No.: US 9,099,148 B2
(45) Date of Patent: Aug. 4, 2015

(54) MAGNETIC Z-DIRECTIONAL CLUTCH

(75) Inventors: Joseph Paul Manes, Arvada, CO (US); Daniel James Plutt, Superior, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 65 days.

(21) Appl. No.: 13/436,489

(22) Filed: Mar. 30, 2012

(65) Prior Publication Data

US 2013/0256615 A1 Oct. 3, 2013

(51) Int. Cl.
*H02K 49/00* (2006.01)
*H02P 15/00* (2006.01)
*G11B 15/68* (2006.01)

(52) U.S. Cl.
CPC .................................. *G11B 15/6835* (2013.01)

(58) Field of Classification Search
CPC ........ F16D 2121/22; B66D 5/14; B66D 5/30; G11B 7/08582; B65B 3/04
USPC ........... 74/411.5; 192/216; 310/92–93, 96–97
See application file for complete search history.

(56) References Cited

U.S. PATENT DOCUMENTS

| 3,176,809 A | * | 4/1965 | Monroe | 192/12 R |
|---|---|---|---|---|
| 3,648,858 A | * | 3/1972 | Barron et al. | 414/139.5 |
| 3,787,031 A | * | 1/1974 | Lucas | 254/290 |
| 3,788,606 A | * | 1/1974 | Solter | 254/290 |
| 3,836,122 A | * | 9/1974 | Pierce, Jr. | 254/273 |
| 3,972,420 A | * | 8/1976 | Stock et al. | 212/285 |
| 4,146,210 A | * | 3/1979 | Koval et al. | 254/375 |
| 4,151,753 A | * | 5/1979 | F'Geppert | 74/31 |
| 4,151,983 A | * | 5/1979 | Stock et al. | 294/66.2 |
| 4,175,727 A | * | 11/1979 | Clarke | 254/274 |
| 4,187,681 A | * | 2/1980 | Johnson | 60/395 |
| 4,224,545 A | * | 9/1980 | Powell | 310/93 |
| 4,258,580 A | * | 3/1981 | Lowe | 74/109 |
| 4,327,873 A | * | 5/1982 | Juppet et al. | 242/413.5 |
| 4,344,587 A | * | 8/1982 | Hildreth | 242/390.9 |
| 4,448,395 A | * | 5/1984 | Purdy | 254/334 |
| 4,545,567 A | * | 10/1985 | Telford et al. | 254/344 |
| 4,635,491 A | * | 1/1987 | Yamano et al. | 74/89.41 |
| 4,678,164 A | * | 7/1987 | Yang | 254/93 H |
| 4,813,814 A | * | 3/1989 | Shibuta et al. | 405/198 |
| 4,946,014 A | * | 8/1990 | Okada | 192/216 |
| 5,217,345 A | * | 6/1993 | Baur | 414/807 |
| 5,327,055 A | * | 7/1994 | Danielson et al. | 318/366 |
| 5,631,511 A | * | 5/1997 | Schulmann et al. | 310/83 |
| 5,679,993 A | * | 10/1997 | Oswald | 310/93 |
| 5,692,733 A | * | 12/1997 | Hiramatsu | 254/274 |

(Continued)

*Primary Examiner* — Emmanuel M Marcelo
*Assistant Examiner* — Michael Gallion
(74) *Attorney, Agent, or Firm* — Marsh Fischmann & Breyfogle LLP; Daniel J. Sherwinter

(57) ABSTRACT

Systems and methods are described for providing a magnetic clutch to limit Z-directional motion of a mass (e.g., a carriage for transporting a robotic mechanism in context of a storage library). According to embodiments, the mass is suspended by cabling, and its Z-directional movement is controlled by a Z-drive assembly. The Z-drive assembly includes a drive gear made of a magnetic or conductive material, and the drive gear is in magnetic communication with a biasing magnet. Embodiments configured the biasing magnet with a particular magnetic moment and a position relative to the drive gear, so that the spinning of the drive gear induces magnetic currents that tend to counteract the motion of the gear. For example, in the event of power loss to the Z-drive assembly, magnetic clutching is used to limit or prevent motion of the mass under the force of gravity.

20 Claims, 10 Drawing Sheets

(56) References Cited

U.S. PATENT DOCUMENTS

| | | | | |
|---|---|---|---|---|
| 5,791,442 | A * | 8/1998 | Arnold | 188/138 |
| 5,819,876 | A * | 10/1998 | Chao | 187/263 |
| 5,830,105 | A * | 11/1998 | Iizuka | 477/92 |
| 5,886,977 | A * | 3/1999 | Ota et al. | 720/665 |
| 6,250,169 | B1 * | 6/2001 | Weisser | 74/89.17 |
| 6,460,828 | B1 * | 10/2002 | Gersemsky et al. | 254/267 |
| 6,794,778 | B1 * | 9/2004 | Walker et al. | 310/77 |
| 6,918,129 | B2 * | 7/2005 | Sudou | 720/664 |
| 7,866,633 | B2 * | 1/2011 | Weiss et al. | 254/378 |
| 7,891,641 | B1 * | 2/2011 | Miller | 254/346 |
| 7,984,894 | B1 * | 7/2011 | Chauza | 254/344 |
| 8,246,010 | B2 * | 8/2012 | Hess | 254/368 |
| 2002/0131198 | A1 * | 9/2002 | Kim | 360/96.5 |
| 2002/0171072 | A1 * | 11/2002 | Tso-Kuo | 254/345 |
| 2007/0108003 | A1 * | 5/2007 | Drewe et al. | 188/381 |
| 2007/0132324 | A1 * | 6/2007 | Coupart | 310/67 R |
| 2008/0142298 | A1 * | 6/2008 | Blasek | 182/101 |
| 2011/0026971 | A1 * | 2/2011 | Ino et al. | 399/222 |
| 2011/0180770 | A1 * | 7/2011 | Karambelas et al. | 254/344 |
| 2012/0137807 | A1 * | 6/2012 | Mizuno et al. | 74/411.5 |

* cited by examiner

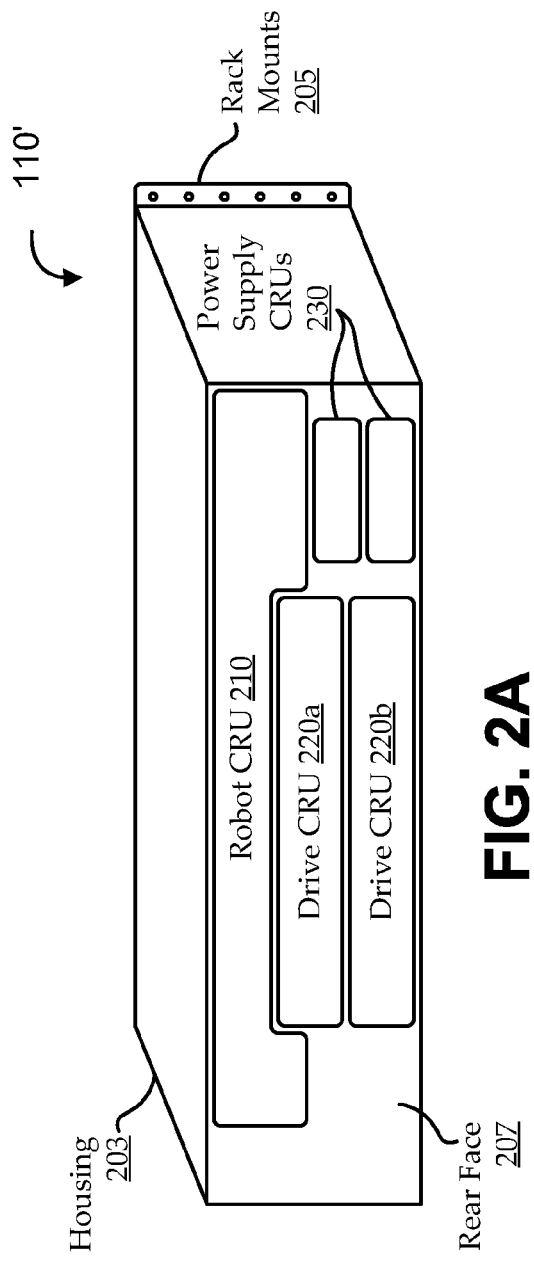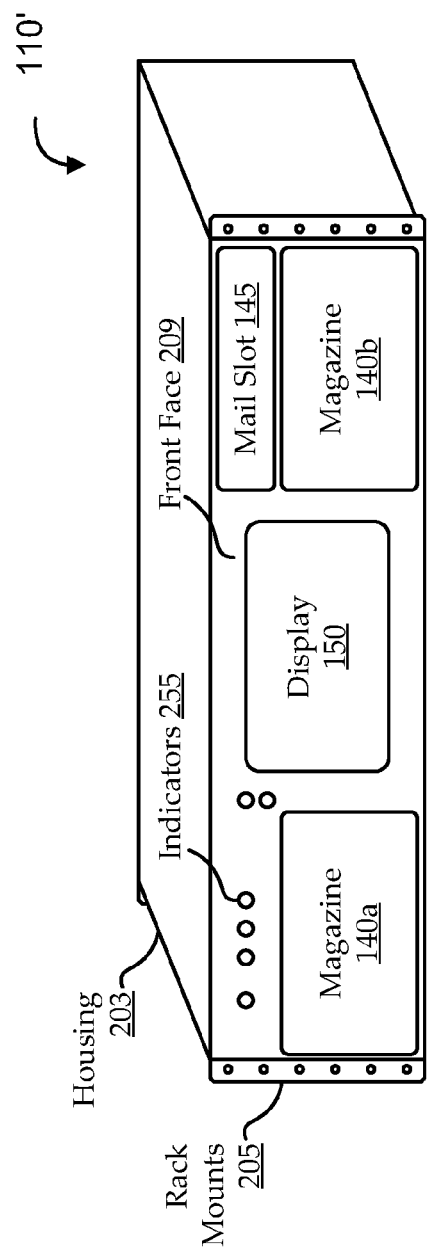

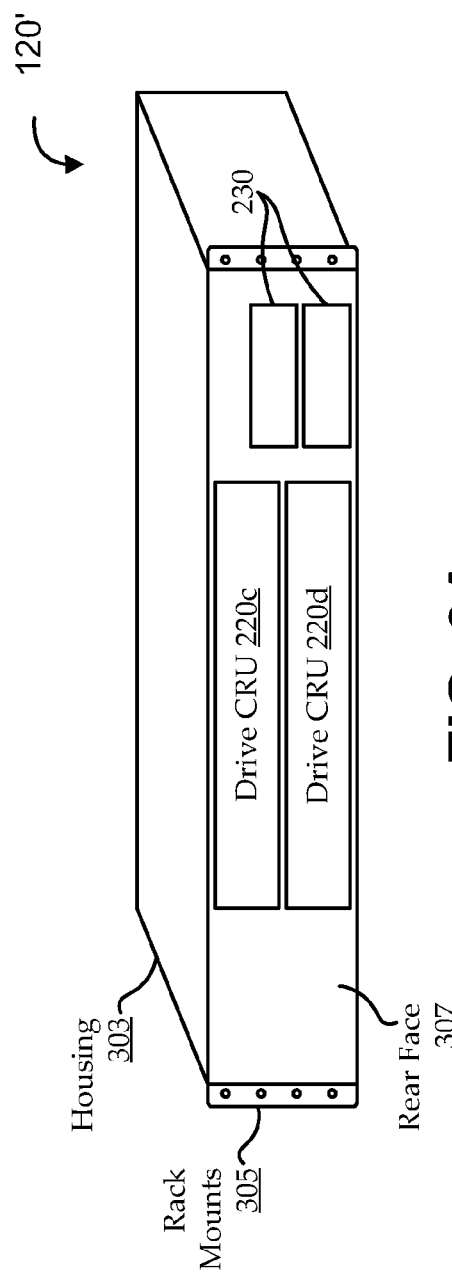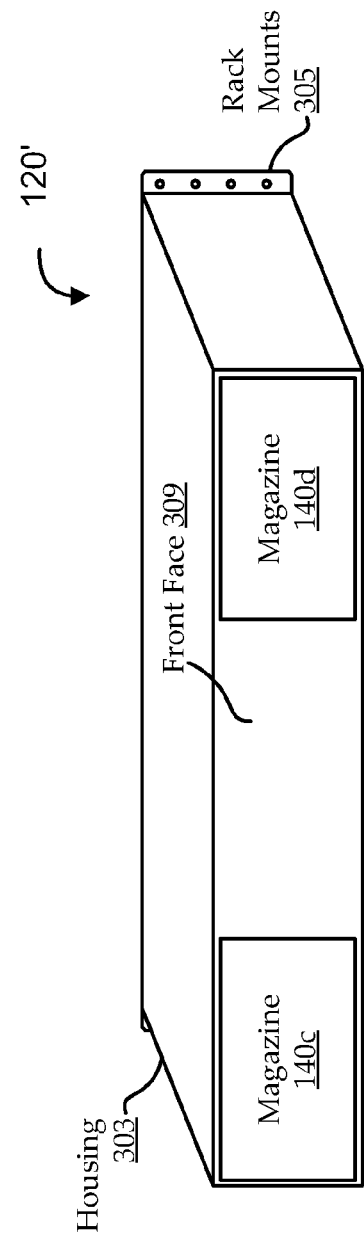
FIG. 3A
FIG. 3B

MAGNETIC Z-DIRECTIONAL CLUTCH

FIELD

Embodiments relate generally to data storage systems, and, more particularly, to clutching in storage libraries.

BACKGROUND

Storage library systems are often used by enterprises and the like to efficiently store and retrieve data from storage media. In the case of some storage libraries, the media are data cartridges (e.g., tape cartridges) that are typically stored and indexed within a set of magazines. When particular data is requested, a specialized robotic mechanism finds the appropriate cartridge, removes the cartridge from its magazine, and carries the cartridge to a drive that is designed to receive the cartridge and read its contents. Some storage libraries have multiple drives that can operate concurrently to perform input/output (IO) operations on multiple cartridges.

In some implementations, the robotic mechanism is disposed on a carriage that hangs on a system of cables or other supports. The vertical motion of the robotic mechanism can be controlled using gears, pulleys, and the like to move the carriage. Effectively, the carriage acts as a mass, supported against gravity by a vertical drive assembly. If the vertical drive assembly fails (e.g., if there is power loss to the drive assembly), it may be desirable to limit the speed at which the vertical position of the carriage can change (e.g., limit the speed at which the carriage will fall and/or prevent the carriage from moving at all). In this and similar types of environments, various mechanical techniques may typically be used to slow the motion of the mass. Some typical approaches include braking mechanisms, ratcheting mechanisms, and/or other mechanical friction-inducing components. Other typical approaches use liquids or other substances of particular viscosity or compressibility to slow the motion of the mass.

These traditional approaches can be limited in various ways. One such limitation is that mechanical friction-inducing components are likely to generate wear over time and can even produce debris. Another such limitation is that, when using techniques based on physical friction, it is often difficult to control the amount of friction being applied, and the amount of friction force applied often changes over the life of the components (e.g., as they wear). Yet another limitation is that typical friction-inducing components can often be relatively expensive.

BRIEF SUMMARY

Among other things, systems and methods are described for providing a magnetic clutching force to limit Z-directional motion of a mass. Some embodiments operate in context of a storage library, in which the mass is a carriage for transporting a robotic mechanism in at least the Z-direction. The mass (e.g., carriage) is suspended by cabling, and its Z-directional movement is controlled by a Z-drive assembly. The Z-drive assembly includes a drive gear made of a magnetic or conductive material (e.g., steel, iron, etc.). The drive gear is in magnetic communication with a biasing magnet. For example, the biasing magnet has a particular magnetic moment and is positioned relative to the drive gear so that the spinning of the drive gear induces magnetic currents that tend to counteract the motion of the gear, thereby acting as a clutch. In some embodiments, a feedback control system is provided to sense certain types of movement and to adjust the magnetic field accordingly. For example, the control feedback can be used to dynamically adjust the positioning of the magnet (e.g., move the magnet closer to or further from the drive gear) or to dynamically change electromagnetic force being generated (e.g., implementing the magnet as an electromagnet).

According to one set of embodiments, a system is provided. The system includes a structural framework having a rack, and a Z-drive assembly coupled with the rack. The Z-drive assembly includes: a cable delivery subsystem having one or more cables configured to couple the mass with the Z-drive assembly in such a way as to suspend the mass in context of a Z-directional force in the structural framework; a gearing subsystem coupled with the cable delivery subsystem and configured to control Z-directional motion of the mass using a mechanism that has an internal friction force that is insufficient to hold the mass in place against the Z-directional force when the gearing subsystem is in an unpowered state; and a magnetic clutch subsystem configured to apply a non-contact magnetic resistive force to the mechanism of the gearing subsystem in such a way that the magnetic resistive force, when added to the internal friction force, is of at least a sufficient magnitude to hold the mass against the Z-directional force when the gearing subsystem is in the unpowered state.

According to another set of embodiments, a drive system is provided. The drive system includes: a gearing subsystem coupled With a mass that is suspended in context of a Z-directional force, the gearing subsystem configured to control Z-directional motion of the mass using a mechanism that has an internal friction force that is insufficient to hold the mass in place against the Z-directional force when the gearing subsystem is in an unpowered state; and a magnetic clutch subsystem configured to apply a non-contact magnetic resistive force to one or more gears of the gearing subsystem to resist rotational motion of the one or more gears, in such a way that the magnetic resistive force, when added to the internal friction force, is of at least a sufficient magnitude to hold the mass against the Z-directional force when the gearing subsystem is in the unpowered state. In some such embodiments, the gearing subsystem includes a gear that includes a magnetic material; and the magnetic clutch subsystem includes a magnet disposed at a position radially to an axis of the gear so as to leave an air gap between the magnet and the gear.

According to yet another set of embodiments, a method is provided. The method includes: controlling Z-directional motion of a mass in context of a Z-directional force acting on the mass using a gearing subsystem having an internal friction force that is insufficient to hold the mass against the Z-directional force when the gearing subsystem is in an unpowered state; and applying a non-contact magnetic resistive force to the gearing subsystem, the magnetic resistive force, when added to the internal friction force, being of at least a sufficient magnitude to hold the mass against the Z-directional force when the gearing subsystem is in the unpowered state.

BRIEF DESCRIPTION OF THE DRAWINGS

The present disclosure is described in conjunction with the appended figures:

FIGS. 2A and 2B show rear and front views, respectively, of an illustrative base module, according to various embodiments;

FIGS. 3A and 3B show rear and front views, respectively, of an illustrative expansion module, according to various embodiments;

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
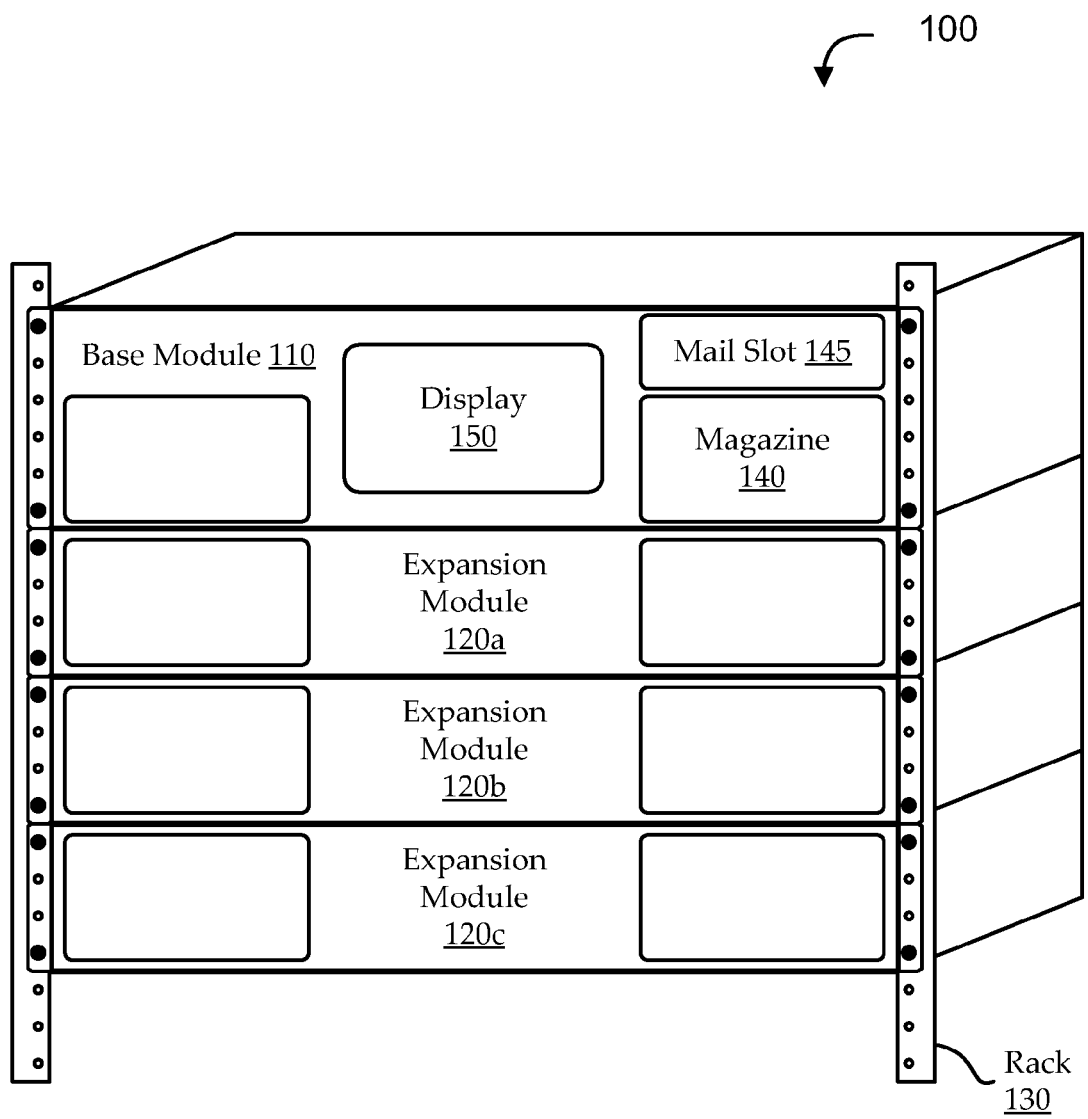
FIG. 1 shows a block diagram of an illustrative rack-mounted storage library, to provide a context for various embodiments.

For the sake of context, FIG. 1 shows a rack-mounted storage library 100 for use with various embodiments. The storage library 100 includes a base module 110 and one or more expansion modules 120, configured to be mounted in an equipment rack 130 (only the mounting rails of the equipment rack 130 are shown for simplicity). The base module 110 and expansion modules 120 provide physical storage for multiple storage media cartridges (e.g., tape cartridges) in magazines 140. Embodiments also include one or more media drives (e.g., tape drives), controllers, power supplies, indicators, communications subsystems, and/or other functions. As will be discussed more fully below, the storage library 100 also includes a robotic mechanism for finding and ferrying storage media cartridges between locations within the storage library 100 (e.g., magazines 140 and drives).

According to an illustrative embodiment, the storage library 100 is a small, rack-mounted, automated tape library. The base module 110 is "3 RU" high (three standard rack units, or approximately 5.25-inch high) and includes one robotic mechanism. Up to nine additional, "2 RU" high (approximately 3.5-inch high) expansion modules 120 can be added to provide additional drive and/or magazine 140 slot capacity, so that a maximum configuration of one base module 110 and nine expansion modules 120 has a total height of "21 RU," or half of a standard equipment rack 130. The single robot mechanism is configured to access all magazine 140 slots and drives in the base module 110 and all expansion modules 120.

In the illustrative embodiment, each of the base module 110 and the expansion modules 120 can house up to two half-height or one full-height LTO5 tape drives. Each of the base module 110 and the expansion modules 120 can also house two removable magazines 140, each having fifteen cartridge slots. In some implementations, the storage library 100 can be divided into partitions each associated with, for example, at least one drive and at least one magazine 140. Each partition can be configured to behave as an independent library, notwithstanding that all partitions share the single robotic mechanism (e.g., partitions can be commanded as independent libraries for tape operations, while sharing many resources for service and administration). Some implementations also include a "mailslot" 145 in the base module 110, as discussed below.

Some embodiments provide local and remote management of various functions through graphical user interfaces (GUI). In one implementation, the local interface GUI is displayed on a seven-inch, front-mounted, touch-screen panel display 150. The remote interface may be implemented as a browser-based interface (BUI), accessible by connecting a web browser to the library's Internet protocol (IP) address.

Some embodiments are configured to be installable and serviceable by end customers to the greatest extent practical. For example, an installation wizard may be provided to simplify initial installation, a simple rack rail system for base modules 110 and expansion modules 120 will allow two people without any mechanical assistance (e.g. lift) to easily install the modules on an equipment rack 130. In some such embodiments, most replaceable library components will be Customer Replaceable Units (CRUs) (i.e., as opposed to field replaceable units (FRUs), which are serviceable and/or replaceable only by trained technicians). For example, certain implementations allow almost all installation, maintenance, upgrades, and/or normal use of the storage library 100 to be performed with only front and rear access to the equipment rack 130 and few or no tools.

FIGS. 2A and 2B show rear and front views, respectively, of an illustrative base module 110', according to various embodiments. The illustrative base module 110' may be an implementation of base module 110 of FIG. 1. As shown, the base module 110' includes a housing 203 (e.g., a chassis) configured with rack mounts 205 for mounting to an equipment rack (e.g., as shown in FIG. 1). A rear face 207 and a front face 209 are also shown as part of the housing 203. As discussed above, embodiments such as the one illustrated as base module 110', are designed to facilitate customer serviceability. Accordingly, most of the replaceable components are shown as accessible from the front and rear exterior of the base module 110', which would be substantially exposed when mounted in a standard equipment rack.

Looking at the rear view of the base module 110' in FIG. 2A, access is provided to a robot CRU 210, one or more drive CRUs 220, and one or more power supply CRUs 230. As will be described more fully below, the robot CRU 210 is configured to house the robotic mechanism and supporting components (e.g., mechanical drive modules, control hardware and software modules, configuration memory, etc.). Traditional storage library systems typically are configured so that the robotic mechanisms are only serviceable by highly trained personnel, and even removing the mechanism to send out for off-site servicing requires training, specialized tools, or the like. The ability to replace the entire robotic mechanism and all its supporting components in a single CRU is a novel improvement over traditional implementations. For example, implementations allow a customer to simply pop out a broken robot CRU 210 using a couple of thumb screws, slide in a replacement CRU, and reinitialize the system, without waiting for a technician to troubleshoot and fix any issues.

Embodiments of the drive CRUs 220 are media drive modules that can be removed by an end consumer. Various implementations support standard, half-height or full-height tape drives. As described more fully below, the port in the drive for receiving a media cartridge faces into the base module 110', so that media cartridges can only he inserted and/or removed by the robotic mechanism within the confines of the housing 203. In some implementations, one or more "external" media drives may be provided to facilitate troubleshooting and the like.

Embodiments of the power supply CRUs 230 include any useful type of power supply components for supplying power to the base module 110' and or to any other components (e.g., to one or more expansion modules 120 (not shown)). For example, the power supply CRUs 230 can include power generators, power converters, power conditioners, back-up batteries and/or other power duplication, switches, input and/ or output ports, indicators, and the like. In some implementations, each power supply CRU 230 includes a male, three-prong connector for interfacing with line power and a main power switch. Some embodiments include a power supply CRU 230 for each drive CRU 220 (i.e., if the base module 110' has only a single drive CRU 220, it may also only have a single power supply CRU 230 to support the drive). In other embodiments, a second power supply CRU 230 is used as a backup supply to the first power supply CRU 230, and may be coupled with a different power source.

In one implementation, the base module 110' has slots for two power supplies (e.g., two power supply CRUs 230). These can be implemented as custom power supplies, for example, having an input voltage of 100-250 volts AC at 50-60 Hertz, and an output voltage of twelve volts DC switched plus five volts DC standby power. For example, the power supplies may be sized to run two tape drives plus robotics and any other sensors, etc. (e.g., with or without redundancy). Typically, the base module 110' has at least one power supply, even if no drives are included, to support the main processor, interface functionality (e.g., the display 150), etc.

Looking at the front view of the base module 110' in FIG. 2B, access is provided to a display 150, one or more magazines 140, and a mailslot 145. One or more indicators 255 may also be provided to show certain operational states, and the like (note that the sizes, numbers, positions, etc. of the indicators shown are intended only to be illustrative). In various implementations, base module 110 has overall library status indicators on the front and back of the module, along with a locate switch which activates the front and back locate LEDs; powered CRUs may have their own status indicators; hot-swappable CRUs can have indicators that show when the CRUs can be safely removed; power supplies and tape drives can have additional indicators; an "AC present" indicator can be provided to stay on even when the storage library is off (as long as AC power is connected). In one embodiment, a set of primary indicators include "locate," "fault," and "OK" indications. Next to the primary indicators are secondary indicators specific for the operator panel that indicate the status of the operator panel (e.g., an operator panel CRU, if implemented as such).

Other types of indications and status can also be provided using the display 150. Embodiments of the display 150 are used to facilitate various functionality through a local graphical user interface (GUI), including, for example, IO functions, service and diagnostic functions, etc. In one implementation, the display 150 is a seven-inch, front-mounted, touch-screen panel (e.g., an LCD touch panel display with a WVGA (wide VGA) 800×480 pixel screen equipped with a resistive or capacitive touch-sensitive overlay).

Each magazine 140 can be configured to hold multiple (e.g., up to fifteen) cartridges in such a way as to be reliably accessed by the robotic mechanism. For example, the magazines 140 can be designed to have features to aid in targeting, location, and or other functions of the robotic mechanism; features that securely hold the cartridges in place, while allowing for easy release of the cartridges to a robotic gripper when desired; features to add strength to the magazines 140 (e.g., to reduce sag, increase usable life, etc.) and/or to reduce weight; etc.

Embodiments of the mailslot 145 (or "Cartridge Access Port" (CAP)) include a special type of magazine designed to act as a controlled interface between the human user and the robotic mechanism. To add or remove cartridges from the storage library, a user ejects the mailslot 145 from the base module 110' and is presented with a number of cartridge slots (e.g., four "Import/Export cells" ("I/E cells")). The user can then insert cartridges into, or remove cartridges from, these slots without interfering with robotic mechanism's operations. In some implementations, the robotic mechanism is used to activate a latch internal to the base module 110, thereby allowing the user to remove the mailslot 145 only when the robotic mechanism is in an appropriate condition (e.g., parked in the robot CRU 210). Certain embodiments having data partitions (as discussed above) only allow one partition at a time to make use of the mailslot 145.

FIGS. 3A and 3B show rear and front views, respectively, of an illustrative expansion module 120', according to various embodiments. The illustrative expansion module 120' may be an implementation of expansion module 120 of FIG. 1. As shown, the expansion module 120' includes a housing 303 (e.g., a chassis) configured with rack mounts 305 for mounting to an equipment rack (e.g., as shown in FIG. 1). A rear face 307 and a front face 309 are also shown as part of the housing 303. As with the base module 110' of FIGS. 2A and 2B, the expansion module 120' is designed to facilitate customer serviceability. Most of the replaceable components are shown as accessible from the front and rear exterior of the expansion module 120', which would be substantially exposed when mounted in a standard equipment rack.

In the embodiment shown, various aspects of the expansion module 120' are similar or identical to the base module 110'. For example, embodiments of the expansion module 120' do not typically have a robot CRU 210, display 150, or mailslot 145, as they are configured to exploit that functionality from the base module 110' components. However, like the base module 110', the expansion module 120' includes one or more drive CRUs 220 and one or more power supply CRUs 230 configured to be accessed from the rear side of the expansion module 120', and one or more magazines 140 configured to be accessed from the front side of the expansion module 120'. In some embodiments, the drive CRUs 220, power supply CRUs 230, and/or magazines 140 of the expansion module 120' are the same as those implemented in the base module 110'.

Because of the lack of certain features in embodiments of the expansion module 120' (e.g., there may be no robot CRU 210, no main processor, etc.), expansion module 120' power requirements may be different from those of the base module 110. In certain implementations, the expansion modules 120' still have slots for two power supplies (e.g., two power supply CRUs 230), which can be implemented as the same power supplies used in the base module 110 (e.g., to avoid having to support or source multiple types of power supplies). However, the power supplies of the base module 110 may provide more power than is needed to run configurations of the expansion modules 120'. For example, a single power supply may be able to support an expansion module 120' even with two drives, and it is possible to implement an expansion module 120' with no drives and no power supplies. Alternatively, two power supplies may still be used, for example, to provide redundancy.

As discussed above, the base module 110' and expansion modules 120' include a number of components that can be designed for customer replaceability, including the robot CRU 210, drive CRUs 220, power supply CRUs 230, and magazines 140. It is worth noting that, even though these components may be accessible and replaceable by customers, embodiments may still be configured to prevent (or mitigate) undesirable interference with those components. As one example, those replaceable components typically are installed in a physically secure manner (e.g., using latches, thumbscrews, removable faceplates, and/or other techniques) to provide relatively easy access when needed, while mitigating inadvertent access (e.g., accidental removal of a magazine 140 during operation). As another example, certain embodiments may allow a drive CRU 220 to be removed during operation of the storage system, so long as the drive is not actively in use (e.g., by using a drive eject or park command, or other technique). As still another example, removal of the robot CRU 210 or magazines 145 may be prevented until certain operations have been completed (e.g., the robotic mechanism is parked within the base module 110', etc.).

Figure 4A:
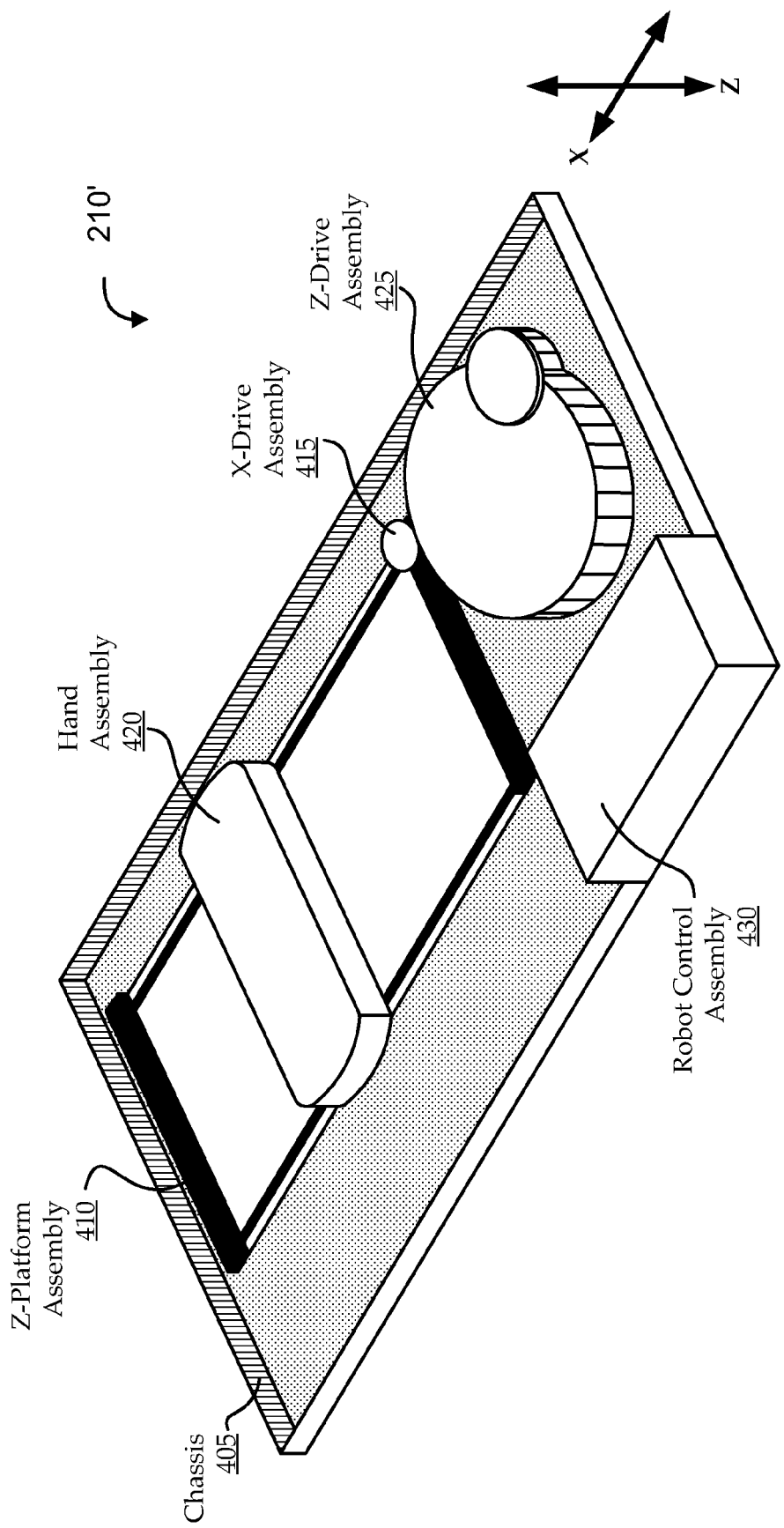
FIG. 4A shows a view looking down on the underside of an illustrative robot CRU (customer replaceable unit), according to various embodiments.
Figure 4B:
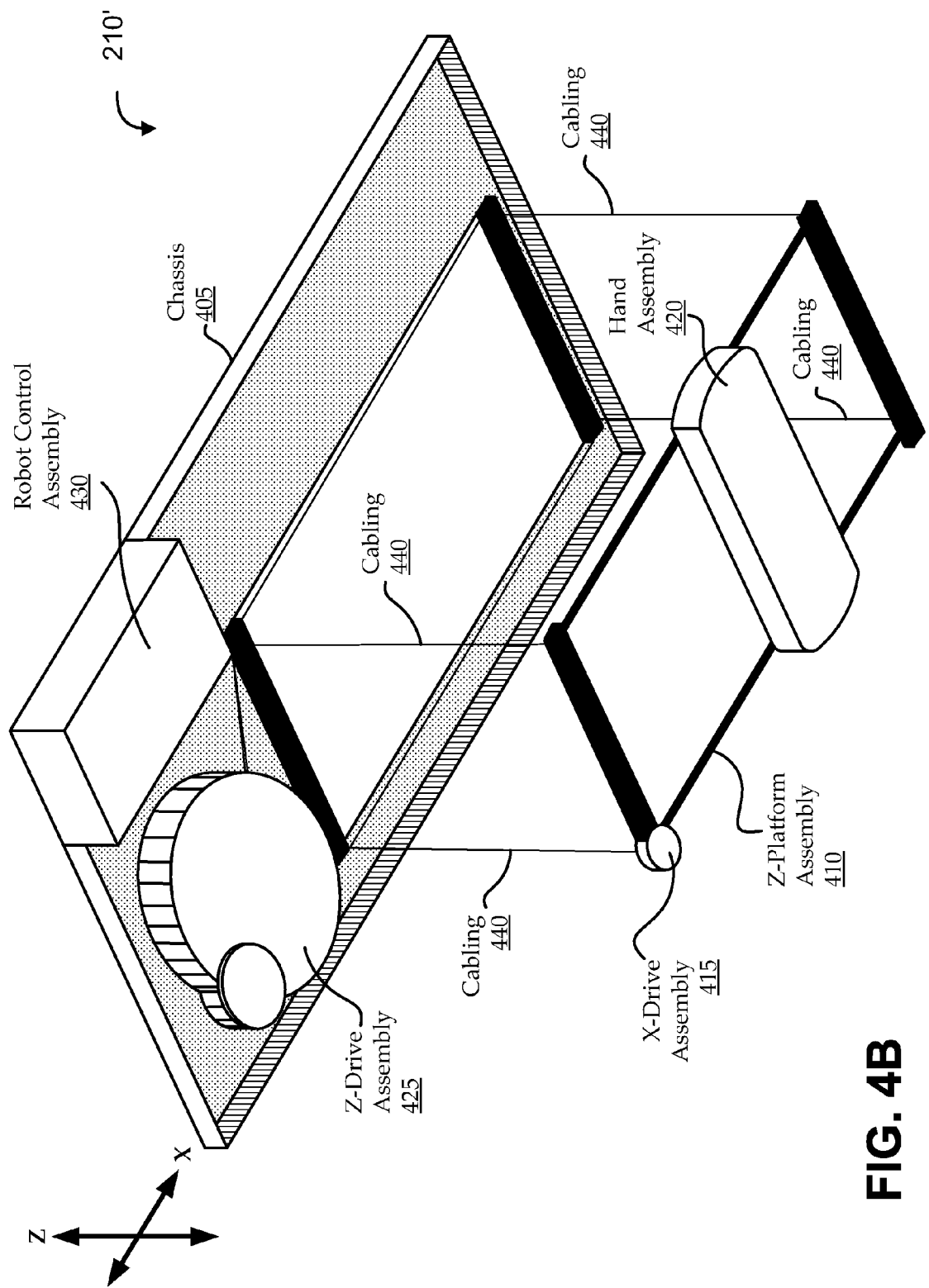
FIG. 4B shows another view looking up at the underside of an illustrative robot CRU with the Z-platform assembly partially lowered, according to various embodiments.

Much of the functionality of storage systems, like those discussed above with reference to FIGS. 1-3B, is facilitated by the robotic mechanism. As discussed above, the robotic mechanism is used to locate cartridges and ferry them between magazine slot locations and media drives. FIGS. 4A and 4B illustrate two views of an illustrative robot mechanism implemented as part of a robot CRU 210. The illustrations and descriptions of the robotic mechanism are highly simplified and represent only on possible type of implementation. Accordingly, they are intended only to add clarity and context and should not be construed as limiting the scope of the invention.

Turning to FIG. 4A, a view is shown looking down on the underside of an illustrative robot CRU 210', according to various embodiments. The robot CRU 210' may be an implementation of the robot CRU 210 of a base module 110, as discussed with reference to FIG. 2A. The robot CRU 210' includes a chassis 405 that houses a Z-platform assembly 410, an X-drive assembly 415, a hand assembly 420, a Z-drive assembly 425, and a robot control assembly 430.

In the implementation shown, the robotic mechanism is configured to move from its "home" position in the robot CRU 210' of the base module 110' down and/or over to any magazine 145 slot or drive in the base module 110' or an expansion module 120'. To accomplish this type of motion, the hand assembly 420 of the robotic mechanism moves in at least a "Z" direction (for the sake of FIGS. 4A and 4B, the +Z-direction is up towards the home position in the robot CRU 210, and the −Z-direction is down towards the bottom-most magazine slots of the bottom-most expansion module 120') and an "X" direction (for the sake of FIGS. 4A and 4B, the +X direction is towards the front side of the base module 110' or expansion modules 120', and the −X direction is towards the rear side of the base module 110' or expansion modules 120').

The hand assembly 420 is coupled with the Z-platform assembly 410, which can be moved in the Z-direction (i.e., raised and lowered) by the Z-drive assembly 425. The hand assembly 420 is also able to move along the Z-drive assembly 425 in the X-direction by the X-drive assembly 415 (e.g., along rails that are substantially perpendicular to the Z-directional axis). The Z-drive assembly 425 and X-drive assembly 415 may include any hardware for providing the desired movements, such as cables, gears, belts, rails, wheels, bearings, etc. Embodiments provide other types of motion in other ways. Some embodiments of the hand assembly 420 are coupled to the Z-platform assembly 410 via a "wrist" mechanism (not shown) that provides motion in a yaw direction (i.e., around the Z-directional axis). Some embodiments of the hand assembly 420 further provide radial movement from the Z-directional axis. For example, a grabber mechanism can "reach out" in a radial direction that is determined by the yaw (rotational) orientation provided by the wrist mechanism.

These various types of motion of the robotic mechanism, as well as other functionality of the robotic mechanism, are handled at least in part by the robot control assembly 430. Embodiments of the robot control assembly 430 are effectively the "brains" of the robotic mechanism, including electronic components used to store calibration information for the robotic mechanism, control movements of the robotic mechanism, read and/or decipher sensor information retrieved from the robotic mechanism, etc. For example, if data from a particular cartridge is desired, the robot control assembly 430 may direct the robotic mechanism to move to the magazine slot associated with that cartridge, verify presence of the cartridge, retrieve the cartridge from the magazine, ferry the cartridge to a drive, and release the cartridge into the drive.

For added clarity, FIG. 4B shows another view looking up at the underside of an illustrative robot CRU 210' with the Z-platform assembly 410 partially lowered, according to various embodiments. As illustrated, the Z-platform assembly 410 may not have a solid platform, and may instead be implemented as a carriage having a number of structural members (e.g., rails, supports, etc.). In the particular embodiment shown, the Z-drive assembly 425 includes motors and gearing that drive a bullwheel. The Z-platform assembly 410 is coupled with the bullwheel using a cable and pulley system. For example, cabling 440 is attached at each corner of the Z-platform assembly 410. The four cables 440 pass through pulleys and wrap around the bullwheel. Turning the bullwheel in one direction or the other adds slack to, or removes slack from, the cables 440, causing the Z-platform assembly 410 to be raised or lowered. Once in its desired Z-position (or while moving to that position), the X-drive assembly 415 can be used to move the hand assembly 420 (e.g., along rails of the Z-platform assembly 410) to a desired X-location. Once in its desired X-Z-position (or while moving to that position), the hand assembly 420 can be turned (e.g., using a wrist mechanism) to a desired rotational orientation (e.g., to face a cartridge slot or a media drive, to provide a desired angle for use of a sensor, etc.). If desired, a gripper mechanism may then be used to reach out (i.e., radially) from that X-Z-position and rotational orientation (e.g., to grab or release a cartridge).

It will be appreciated that in embodiments, such as the one shown in FIG. 4B, the Z-platform assembly 410 moves in the Z-direction in a substantially free-floating manner. As the Z-platform assembly 410 is raised or lowered on its cables 440, tension may be maintained on the cables 440 as a result of gravity acting on the Z-platform assembly 410. For example, a system of pulleys and gears (e.g., a bullwheel) are used to add tension to the cables, thereby lifting the Z-platform assembly 410. The same system of pulleys and gears is used to reduce tension on the cables, thereby allowing the Z-platform assembly 410 to fall in a controlled manner under the force of gravity. If the Z-platform assembly 410 is allowed to fall under the force of gravity as desired, the cables will be held in tension under the weight of the Z-platform assembly 410. In alternative environments, the Z-platform assembly 410 may be suspended in a field other than a gravitational field. Further, the Z direction may effectively depend on the type of field in which the Z-platform assembly 410 is suspended. For example, the Z-platform assembly 410 may include a magnetic material that causes the Z-platform assembly 410 to effectively be suspended in an electromagnetic field in a vertical or other direction.

As used herein, the Z direction is intended to refer generally to the direction of the field in which the Z-platform assembly 410 is suspended. Similarly, reference to Z-directional motion, Z-directional forces, Z-drive assemblies 425, and the like are intended to refer to motion, forces, assemblies, etc. operating in the direction of the field in which the Z-platform assembly 410 is suspended. For example, terms like "hanging," "raised," "lowered," "suspended," "Z-directional," and the like are intended to be construed in relation to the type of field acting on the mass and the corresponding direction of the field. For example, in implementations where the mass is hanging in a normal gravitational field, the mass may be hanging as a result of being pulled vertically downward by the gravitational field. In that context, raising, lowering, or otherwise moving the mass in a Z-direction may suggest moving the mass vertically with respect to the gravitational field. In other implementations, where the mass includes magnetic material hanging in a magnetic field, the magnetic material may, in fact, be "hanging" in any direction as dictated by the direction of the magnetic field. In that context, "raising," "lowering," or otherwise moving the mass in a Z-direction, may suggest moving the mass substantially in the direction of or in opposition to the net magnetic field pulling on the carriage. Further, as used herein, the cables 440 are intended to refer generally to any components or materials used to suspend the Z-platform assembly 410 within the field. Embodiments described herein may be applied in the context of any type of mass suspended in the field. Accordingly, techniques described with reference to embodiments that include the Z-platform assembly 410 can also be applied in embodiments that include other types of masses.

Embodiments provide novel magnetic clutching functionality, for example, configured to resist undesired Z-directional motion of a mass. The Z-directional motion of the mass can be controlled using a drive assembly that includes components, such as gears and pulleys. When the drive assembly is properly powered, it has sufficient power to control Z-directional motion of the mass in context of the field. If the drive assembly fails (e.g., if there is a loss of power), however, the drive assembly may be unable to hold mass against the force of the field. For example, the drive assembly has internal friction from various motors, gears, pulleys, and/or other components. In some cases, however, this internal friction may be insufficient to prevent the mass from moving under the force of the field (e.g., the gravitational force acting on the mass), such that the mass will undergo Z-directional motion when there is no power or insufficient power to the drive assembly.

Accordingly, it may be desirable to limit Z-directional motion of the mass under the force of the field when the drive assembly is in its unpowered state (e.g., when there is no power or insufficient power being delivered to the components of the drive assembly). Traditional techniques for limiting Z-directional motion in this context include providing one or more mechanical components to impede the mass's motion. For example, traditional approaches may include braking mechanisms, ratcheting mechanisms, and/or other mechanical friction-inducing components. Other typical approaches use liquids or other substances of particular viscosity or compressibility to slow the motion of the mass.

These traditional approaches can be limited in various ways. One such limitation is that mechanical friction-inducing components are likely to generate wear over time and/or can produce debris. Another such limitation is that, when using techniques based on mechanical friction, it is often difficult to control the amount of friction being applied, and the amount of friction force applied often changes over the life of the components (e.g., as they wear). Yet another limitation is that typical friction-inducing components can often be relatively expensive.

Rather than using traditional (e.g., mechanical) techniques, embodiments use magnetic, non-contact techniques to limit Z-directional motion of the mass when the drive assembly is in its unpowered state. According to some embodiments, the drive assembly includes one or more gears made of the magnetic or conductive material (e.g., steel, aluminum, etc.). The one or more gears are in magnetic communication with a biasing magnet. In some implementations, the biasing magnet has a particular magnetic moment and is positioned relative to the drive gear so that the spinning of the drive gear induces magnetic currents that tend to counteract the motion of the gear, thereby acting as a clutch. When an electrical conductor, moves through the field of a magnet (e.g., a permanent magnet or an electromagnet), electromagnetic induction can create eddy currents. The eddy currents can cause kinetic energy from the rotational motion of the gear to be converted into thermal energy, which may effectively bleed away the kinetic energy as heat, thereby slowing the rotational motion of the conductive gear.

In some embodiments, the magnetic clutch is configured to generate a magnetic field of substantially consistent magnitude. In these embodiments, sufficient magnetic force may be maintained so that, when added to the internal friction of the drive assembly, Z-directional motion of the mass is limited or prevented when the drive assembly is in its unpowered state. In other embodiments, a feedback control system is provided. The feedback control system may be configured to detect that the drive assembly is in its unpowered state and/or that the mass is undergoing Z-directional motion, and to adjust the magnetic field accordingly. For example, the control feedback can be used to dynamically adjust the positioning of the magnet (e.g., move the magnet closer to or further from the drive gear) or to dynamically change electromagnetic force being generated (e.g., implementing the magnet as an electromagnet).

Figure 5:
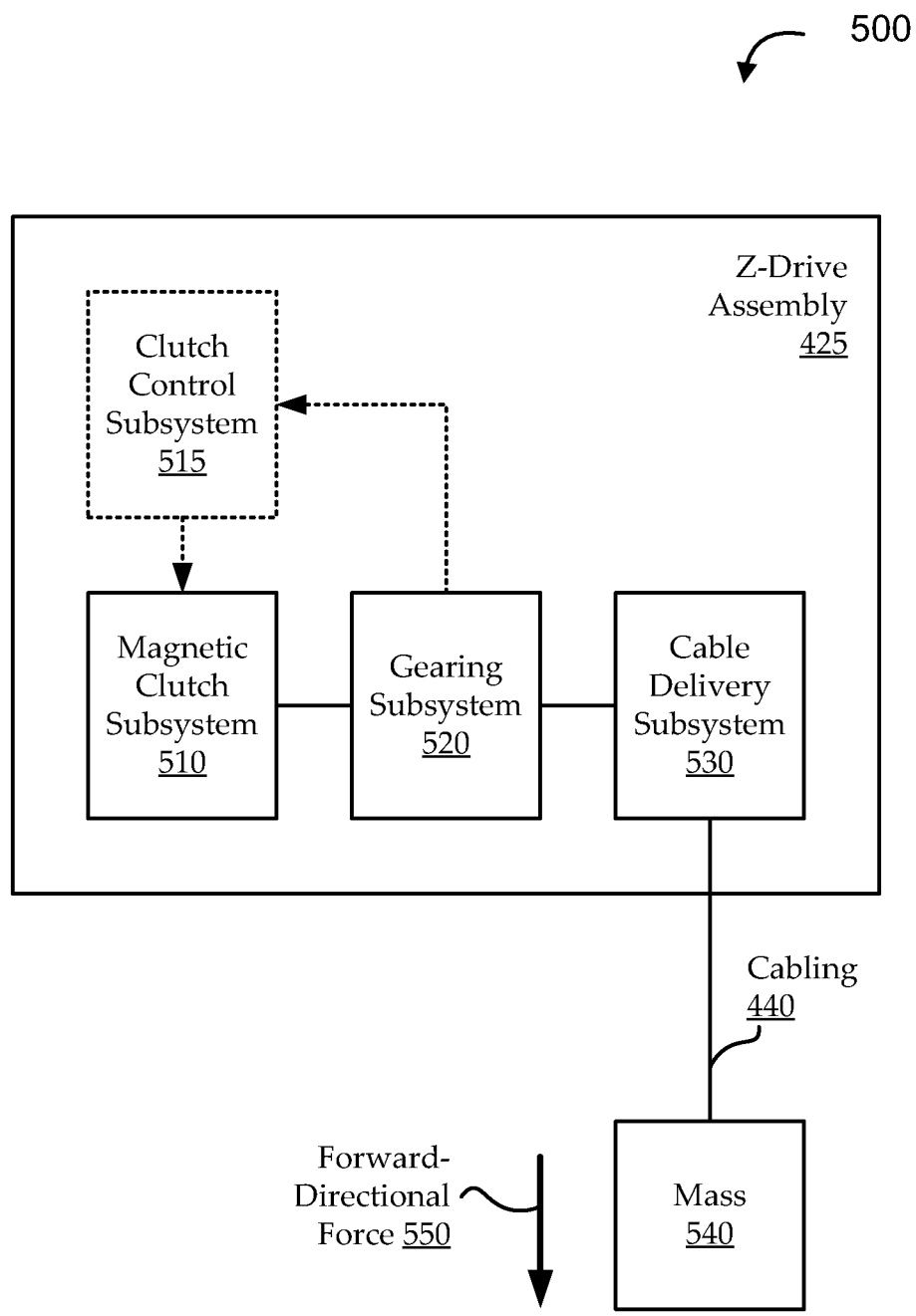
FIG. 5 shows a block diagram is shown of an illustrative magnetic clutching environment, according to various embodiments.

Turning to FIG. 5, a block diagram is shown of an illustrative magnetic clutching environment 500, according to various embodiments. The magnetic clutching environment 500 includes a Z-drive assembly 425 that controls Z-directional movement of a mass 540 via cabling 440. The mass 540 is suspended in context of a forward-directional force 550. As described above, the forward-directional force 550 may be the gravitational force, and electromagnetic force, or the like.

As illustrated, the Z-drive assembly 425 includes a magnetic clutch subsystem 510, a gearing subsystem 520, and a cable delivery subsystem 530. Some implementations also include a clutch control subsystem 515. As described above, the mass 540 is hanging in context of the forward directional force 550 on cabling 440. The mass 540 can be raised or lowered on the cabling 440 using components of the gearing subsystem 520 and the cable delivery subsystem 530. For example, the cable delivery subsystem 530 includes a series of pulleys, channels, and/or the like configured to direct the cabling 440 between the gearing subsystem 520 in the mass 540. The gearing subsystem 520 includes a bull wheel and one or more gears configured to let out and take up slack in the cables 440, thereby raising or lowering the mass 540 via the cable delivery subsystem 530. The gearing subsystem 520 may also include one or more drive motors, controllers, and/or any other components desired for controlling Z-directional motion of the mass 540.

The arrangements of various components of the gearing subsystem 520 and/or the cable delivery subsystem 530 manifest a certain amount of internal friction. For example, a drive motor of the gearing subsystem 520 may be manufactured so that at least a threshold amount of rotational force must be applied to a shaft of the drive motor to cause the shaft to turn when the motor is powered down. The internal friction effectively provides an internal friction force that opposes the forward-directional force 550. When the Z-drive assembly 425 (e.g., or at least the gearing subsystem 520) is in an unpowered state, the internal friction force may resist motion of the mass 540 under the forward-directional force 550. For example, as a result of the internal friction force, the mass 540 will not be in a free-fall state when the gearing subsystem 520 loses power. Typically, however, the internal friction force is insufficient to completely overcome the forward directional force 550. Accordingly, when the Z-drive assembly 425 is in its unpowered state, the mass 540 still moves (e.g., drifts) in the direction of the forward directional force 550.

Embodiments of the magnetic clutch subsystem 510 are configured to provide additional force in the Z-drive assembly 425 to counteract the forward directional force 550 when the Z-drive assembly 425 is in its unpowered state. The magnetic clutch subsystem 510 includes a magnet (e.g., a permanent magnet or electromagnet) that exerts a non-contact magnetic force on the gearing subsystem 520. For example, the magnet is positioned in relation to a gear of the gearing subsystem 520 such that a magnetic force is applied over an air gap between the magnet and the gear. The gear includes (e.g., is manufactured from) magnetic material. The magnetic material can be any type of material that is susceptible to magnetic field, such as iron, steel, aluminum, other electrically conductive materials, etc. For example, the gear may be a drive gear manufactured of steel in such a way as to have desirable magnetic properties, as well as other properties (e.g., hardness, weight, manufacturability, cost, precision, anti-corrosiveness, etc.).

The magnitude of magnetic force experienced by the gearing subsystem 520 as a result of the magnetic clutch subsystem 510 can be adjusted in various ways. In some implementations, the magnetic force is generated by a permanent magnet, such that the strength of the magnetic field being produced by the magnet is substantially consistent, though other factors may affect the magnitude of the magnetic force as experienced by the gearing subsystem 520 (e.g., the size of the air gap between the magnet and the gear). In other implementations, the magnetic forces generated by an electromagnet, so that the magnitude of the magnetic force can be adjusted by changing the power delivered to the electromagnet. Notably, certain implementations can adjust the properties of one or more permanent magnets and/or electromagnets to vary the effective magnetic force, as desired.

Some implementations of the Z-drive assembly 425 include a clutch control subsystem 515. Embodiments of the clutch control subsystem 515 are configured to receive feedback from one or more components of the Z-drive assembly 425 into effect the magnetic force generated by the magnetic clutch subsystem 510 (e.g., and/or the magnetic force experienced by the gearing subsystem 520) according to the feedback. According to certain implementations, the clutch control subsystem 515 receives feedback indicating that the gearing subsystem 520 is in its unpowered state. For example, the clutch control subsystem 515 monitors input power to one or more components of the gearing subsystem 520 to determine when there is total power loss or power loss above some threshold. According to other implementations, the clutch control subsystem 515 receives feedback indicating that the mass 540 is undergoing Z-directional motion (i.e., motion in the direction of the forward directional force 550). Further information, such as additional feedback indicating that the gearing subsystem 520 is in its unpowered state, can be used to indicate that the Z-directional motion of the mass 540 is undesirable. For example, Z-directional motion of the mass 541 the gearing subsystem 520 is in its unpowered state may indicate that the internal friction force from components of the Z-drive assembly 425 is insufficient to hold the mass 540 against the forward directional force 550 when the gearing subsystem 520 is in its unpowered state.

Detection by the clutch control subsystem 515 that the gearing subsystem 520 is in its unpowered state and/or that the mass 540 is undergoing undesirable Z-directional motion can be considered as a triggering event. When the clutch control subsystem 515 experiences the triggering event, it may adjust the magnetic force being applied by the magnetic clutch subsystem 510 and one or more ways. In some implementations, when the triggering event is detected, the clutch control subsystem 515 causes one or more magnetic elements of the magnetic clutch subsystem 510 to physically move so as to change the size of the air gap between the magnetic element(s) and one or more components of the gearing subsystem 520. In other implementations, when the triggering event is detected, the clutch control subsystem 515 adjusts the power being delivered to electromagnetic components of the magnetic clutch subsystem 510, thereby adjusting the magnetic force being experienced by the gearing subsystem 520. Still other implementations can use other techniques to adjust the magnetic force being applied by the magnetic clutch subsystem 510 and/or being experienced by the gearing subsystem 520 in response to feedback triggering events being detected by the clutch control subsystem 515.

Figure 6:
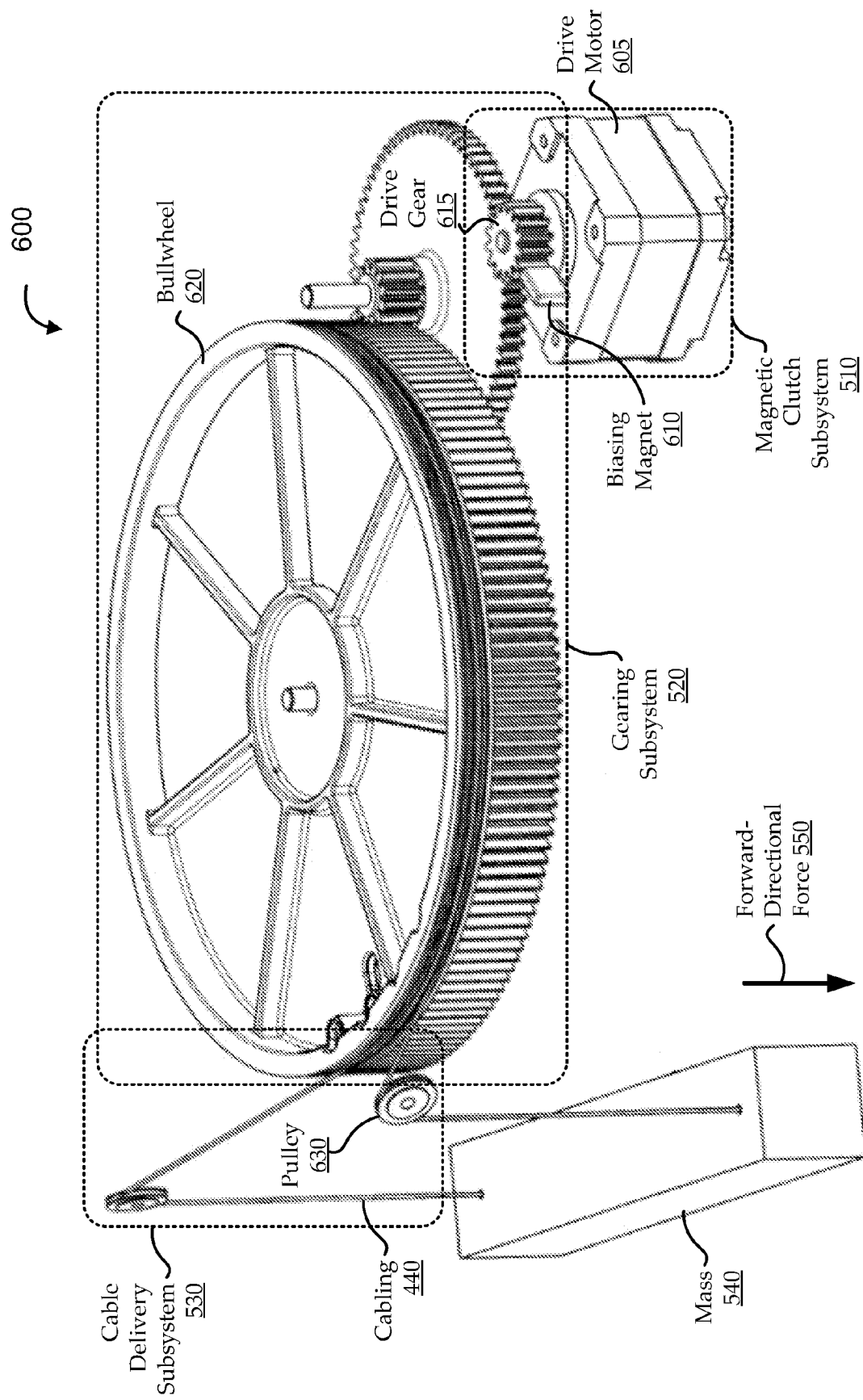
FIG. 6 shows an illustrative simplified magnetic clutching environment, according to various embodiments.

FIG. 6 shows an illustrative simplified magnetic clutching environment 600, according to various embodiments. The magnetic clutching environment 600 includes a magnetic clutch subsystem 510, a gearing subsystem 520, a cable delivery subsystem 530, cabling 440, and a mass 540. The subsystems and their respective components may constitute embodiments of the magnetic clutching environment 500 of FIG. 5. Components of the illustration are grouped within dashed regions for added clarity, however, those groupings are not intended to limit the scope of any embodiments of those or other components. For example, various gears may be considered as part of the magnetic clutch subsystem 510, the gearing subsystem 520, or the cable delivery subsystem 530 without affecting the functionality of embodiments described herein.

As illustrated, the magnetic clutch subsystem 510 may include a drive motor 605. The drive motor 605, when in its powered state, drives rotational motion of a drive gear 615. Rotational motion of the drive gear 615 can be used to turn one or more other gears including, for example, a bull wheel 620. The bull wheel 620 may be configured as a relatively large wheel configured to take in and release cabling 440 via one or more channels in the bull wheel, and to be turned by one or more gears of the gearing subsystem 520. In some embodiments, the bull wheel 620 and one or more other gears (e.g., including the drive gear 615) are considered part of the gearing subsystem 520.

Cabling 440 passes from the bull wheel 620 through the cable delivery system 530. For example, the cable delivery subsystem 530 includes one or more pulleys 630. Though not shown, some implementations of the cable delivery subsystem 530 also include other types of guides for the cabling, such as channels, conduits, etc. The cabling 440 is coupled to the mass 540. As described above, the mass 540 is suspended in context of a forward directional force 550, and the gearing subsystem 520 and cable delivery subsystem 530 are configured to control Z-directional motion of the mass 540 in that context.

The magnetic clutch subsystem 510 also includes one or more biasing magnets 610. The drive gear 615 includes magnetic material, and the one or more biasing magnets 610 are positioned and/or otherwise configured to exert a non-contact magnetic force on the drive gear 615. The non-contact magnetic force is applied to the drive gear 615 by the biasing magnets 610 in such a way as to counteract rotational kinetic energy of the drive gear.

Figure 7A:
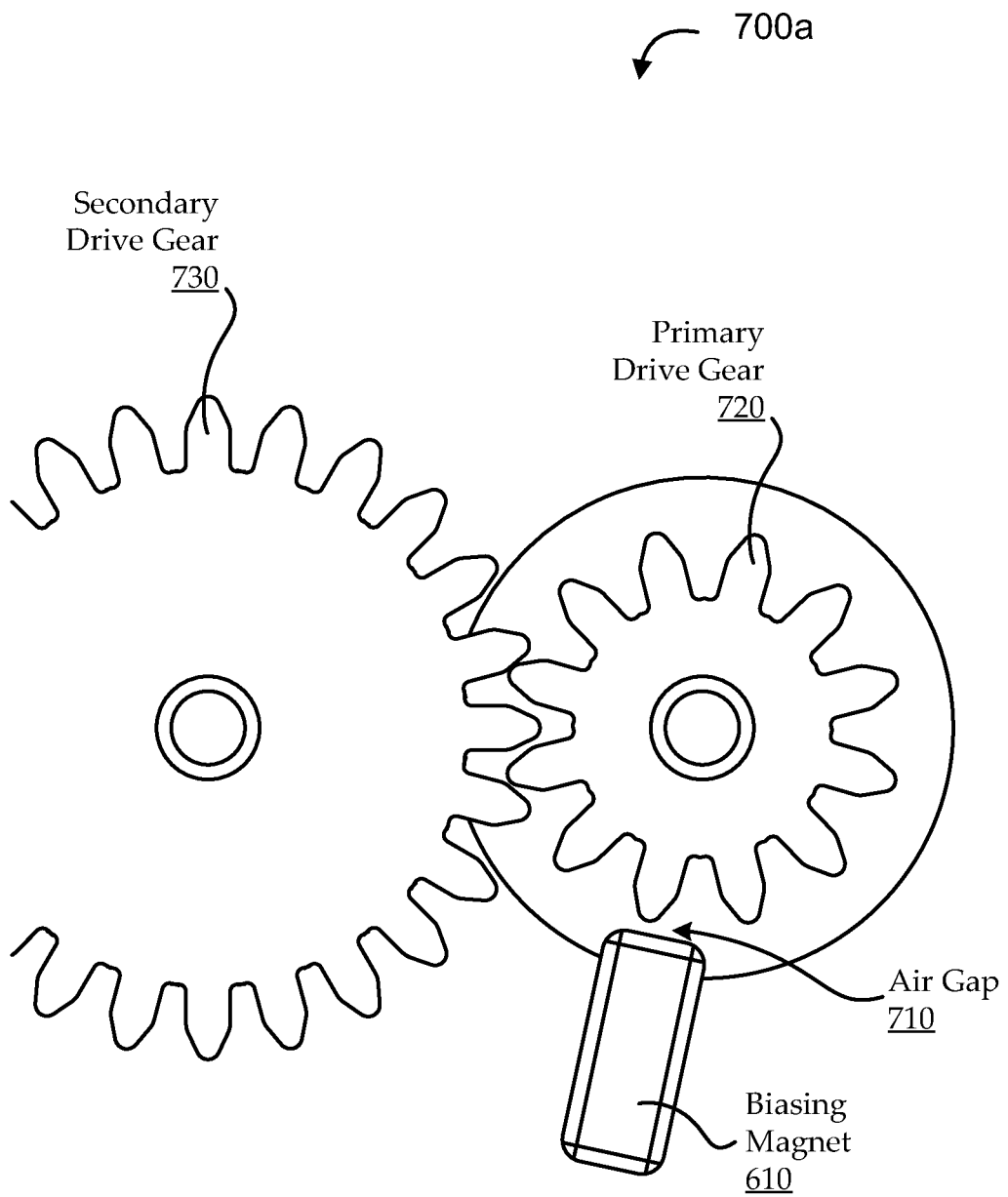
FIG. 7A shows a top view of a partial illustrative magnetic clutching environment, like the one shown in FIG. 6, according to various embodiments.

FIG. 7A shows a top view 700a of a partial illustrative magnetic clutching environment, like the one shown in FIG. 6, according to various embodiments. As illustrated, a primary drive gear 720 is configured to drive a secondary drive gear 730. The secondary drive gear 730 may be gearing of a bull wheel, or another gear in the gearing subsystem 520. The primary drive gear 720 is driven by a drive motor, or the like. As described above, the primary drive gear 720 includes magnetic (e.g., conductive) material that is susceptible to magnetic forces.

A biasing magnet 610 is positioned relative to the primary drive gear 720 so as to exert a non-contact magnetic resistive force on the primary drive gear 720. In the illustrative environment shown, the biasing magnet 610 is positioned radially from an axis of the primary drive gear 720 in such a way as to leave an air gap 710 between the biasing magnet 610 and the teeth of the primary drive gear 720. As the primary drive gear 720 turns, it acts effectively as a moving conductor within the magnetic field generated by the biasing magnet 610. Interaction between the moving conductor and the magnetic field (e.g., inducement of eddy currents in the magnetic field) can effectively resist the rotational motion of the conductor (i.e., the primary drive gear 720).

Figure 7B:
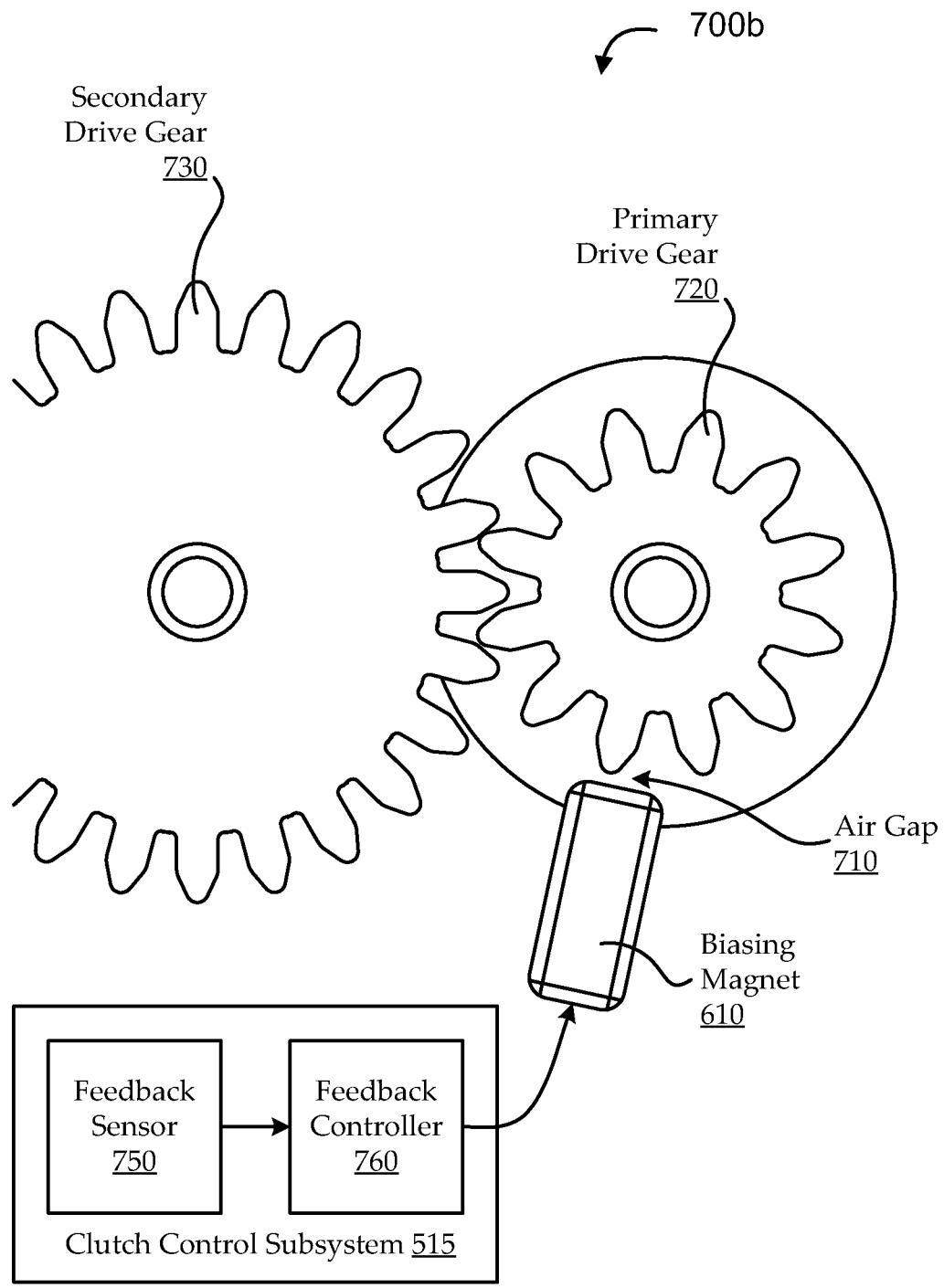
FIG. 7B shows another top view of a partial illustrative magnetic clutching environment that includes a clutch control system, according to various embodiments.

FIG. 7B shows another top view 700b of a partial illustrative magnetic clutching environment that includes a clutch control system 515, according to various embodiments. As in FIG. 7A, the illustrative magnetic clutching environment includes a primary drive gear 720, a secondary drive gear 730, and a biasing magnet 610 positioned with respect to the primary drive gear 720 in such a way as to leave an air gap 710. FIG. 7A can be considered as illustrating use of a permanent magnet in a substantially fixed position, such that the magnetic field generated by the biasing magnet 610 is substantially constant. FIG. 7B, however, is configured to use feedback to affect the magnetic field being generated by the biasing magnet 610 and/or being experienced by the primary drive gear 720.

The clutch control system 515 includes a feedback sensor 750 and a feedback controller 760. The feedback sensor 750 may detect one or more trigger events from components of the gearing subsystem 520 and/or other components of the Z-drive assembly 425. For example, the feedback sensor 750 may detect that the gearing subsystem 520 is in its unpowered state and/or that the mass 540 is undergoing Z-directional motion that is not being controlled by the gearing subsystem 520. When the feedback sensor 750 detects the one or more trigger events, it can communicate that detection to the feedback controller 760.

Embodiments of the feedback controller 760 can control the magnetic resistive force being applied to or experienced by the primary drive gear 720 in various ways. In some implementations, the biasing magnet 610 is an electromagnet, and the feedback controller 760 is configured to adjust the amount of power being delivered to the electromagnet (e.g. the amount of voltage and/or current), thereby increasing or decreasing the magnitude of the magnetic field being generated by the electromagnet. In other implementations, the biasing magnet 610 is a permanent magnet or electromagnet, and the feedback controller 760 is configured to change the physical position of the biasing magnet 610 to increase or decrease the air gap 710, thereby effectively changing the magnitude of the magnetic field as experienced by the primary drive gear 720.

Figure 8:
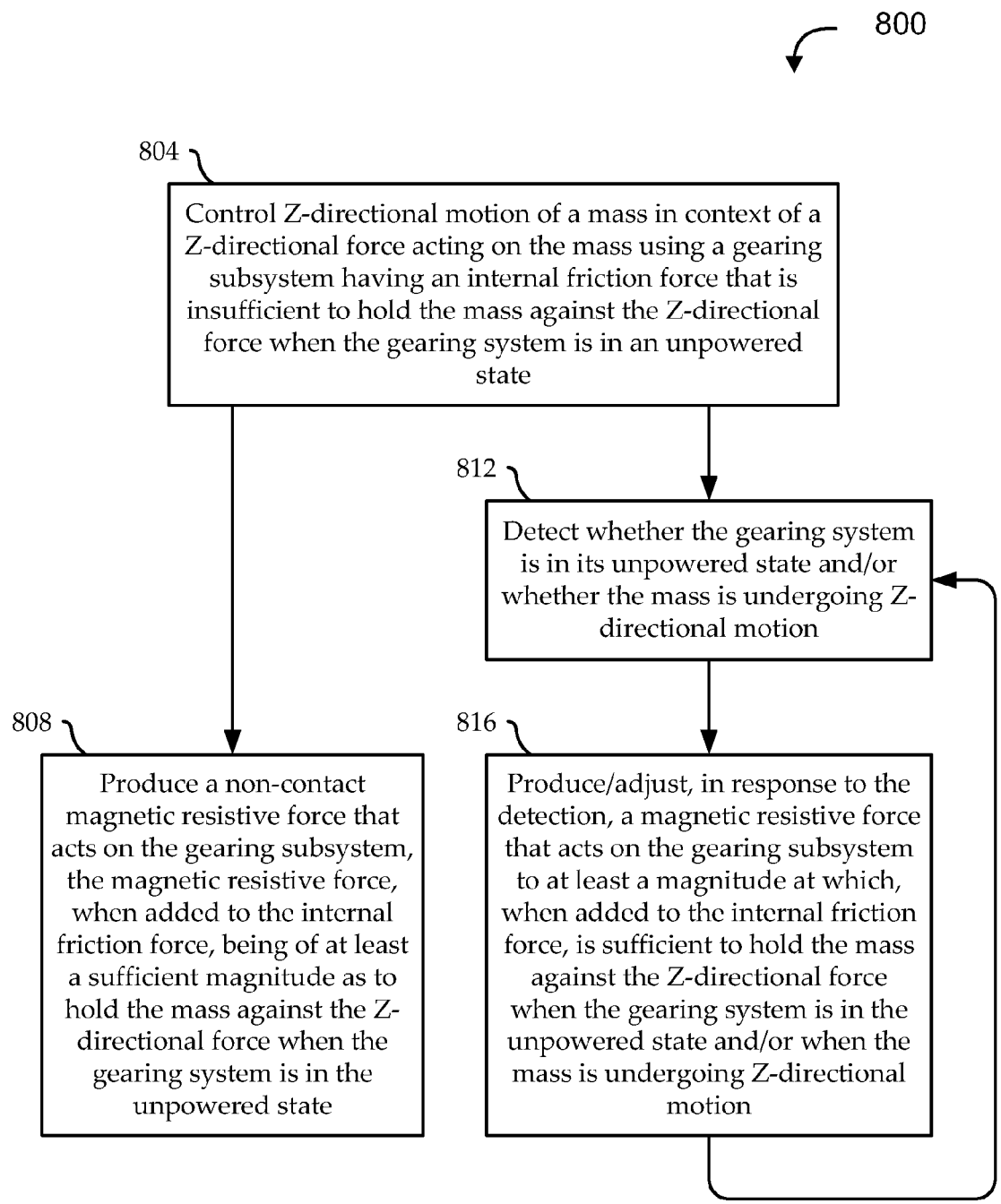
FIG. 8 shows a flow diagram of an illustrative method for providing magnetic clutching functionality, according to various embodiments.

FIG. 8 shows a flow diagram of an illustrative method 800 for providing magnetic clutching functionality, according to various embodiments. Embodiments of the method 800 began at stage 804 by controlling Z-directional motion of a mass in context of a Z-directional force acting on the mass using a gearing subsystem. As described above, the Z-directional force may be the forward-directional force 550 of FIG. 5, which may be, for example, the gravitational force. It is assumed that the gearing subsystem has an internal friction force that arises from its components and the arrangement of its components, and that the internal friction force is insufficient to hold the mass against the Z-directional force when the gearing system is in an unpowered state.

In some embodiments, the method 800 continues at stage 808 by producing a magnetic resistive force that acts on the gearing subsystem. For example, the magnetic resistive force is produced by a magnet positioned to exert a magnetic resistive force on one or more gears of the gearing system to effectively resist rotational motion of the one or more gears. The magnetic resistive force is produced at such a magnitude that, when added to the internal friction force of the gearing subsystem, is at least sufficient to hold the mass against the Z-directional force when the gearing system is in its unpowered state.

For example, a loss or appreciable reduction of power to the gearing subsystem may inhibit the gearing subsystem from further controlling Z-directional motion of the mass. In may be desirable, however, to at least hold the mass in a substantially fixed Z-position when the gearing subsystem is in the unpowered state (e.g., so that the mass does not fall or drift on its own accord under the force of the Z-directional field). Without providing the additional magnetic resistive force, the internal friction force of the gearing subsystem is insufficient to hold the Z-position of the mass against the force of the Z-directional field. The magnetic resistive force is configured to provide at least enough additional resistance (e.g., effective additional internal friction force) to the components of the gearing subsystem to yield sufficient holding force to hold the Z position of the mass against the force of the Z-directional field.

As discussed above, some embodiments use one or more types of feedback to control the production of the magnetic resistive force. Rather than progressing from stage 804 to stage 808, embodiments of the method 800 progress from stage 804 to stage 812. At stage 812, embodiments detect whether the gearing subsystem is in an unpowered state and/or whether the mass is undergoing Z-directional motion. For example, feedback from one or more components of the gearing subsystem, or other components of the Z-drive assembly, can be used to detect that insufficient power is being delivered to the gearing subsystem (e.g., to a drive motor). Additionally or alternatively feedback from one or more components of the gearing subsystem can indicate that the mass is moving not under the control of the gearing subsystem. For example, detecting that a gear is rotating when the gearing subsystem is in its unpowered state may indicate that the forward directional force this pulling on the mass, which is pulling on the cabling and causing the gear to rotate.

At stage 816, a magnetic resistive force is generated (e.g., activated, adjusted, etc.) in response to the detection at stage 812. The magnetic resistive force is generated in such a way as to resist motion of one or more components of the gearing subsystem. For example, the magnetic resistive force is a non-contact magnetic resistive force acting on one or more gears of the gearing subsystem to resist rotational motion of the one or more gears. The magnetic resistive force is generated or adjusted to at least a magnitude at which, when added to the internal friction force of the gearing subsystem, is sufficient to hold the mass against the Z-directional force when the gearing system is in its unpowered state and/or when the mass is undergoing undesirable Z-directional motion.

Production of the magnetic resistive force at stage 816 can be performed in various ways. In some implementations, the magnetic resistive force is produced by turning on an electromagnet in response to detecting one or more trigger conditions at stage 812. In other implementations, the magnetic resistive force is adjusted by adjusting power to an electromagnet, adjusting a position of one or more magnetic components, and/or in any other useful way. In some embodiments, generation and/or adjustment of the magnetic resistive force is performed in such a way as to set the magnitude of the field to a predetermined level. For example, the trigger condition detected in stage 812 is used to trigger operation of one or more magnetic components without further feedback detection. In other embodiments, generation and/or adjustment of the magnetic resistive force is performed dynamically according to continued feedback. For example, the magnitude of the magnetic resistive force may be increased gradually at least until further feedback indicates that the mass is no longer undergoing Z-directional motion.

It will be appreciated that various modifications are possible without departing from the scope of the invention. For example, embodiments described above associate the biasing magnetic components with one or more gears of the gearing subsystem. Notably, however, similar techniques can be applied to other moving conductive components. In some implementations, the magnetic resistive force is applied to one or more pulleys of the cable delivery subsystem to provide magnetic clutching functionality. In still other implementations, the magnetic resistive force is applied to other or additional components. Further, some implementations combine magnetic clutching with mechanical or other traditional types of clutching for added or alternate functionality.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may he any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teaching as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system comprising:
a structural framework comprising a mass; and
a Z-drive assembly coupled with the mass and comprising:
  a cable delivery subsystem comprising one or more cables configured to couple the mass with the Z-drive assembly in such a way as to suspend the mass in context of a Z-directional force in the structural framework;
  a gearing subsystem coupled with the cable delivery subsystem and configured to control Z-directional motion of the mass using a mechanism that has an internal friction force that is insufficient to hold the mass stationary in opposition to the Z-directional force when the gearing subsystem is in an unpowered state; and
  a magnetic clutch subsystem configured to apply a non-contact magnetic resistive force directly over an air gap to the mechanism of the gearing subsystem in such a way that the magnetic resistive force, when added to the internal friction force, is of at least a sufficient magnitude to hold the mass stationary in opposition to the Z-directional force when the gearing subsystem is in the unpowered state wherein the air gap extends from the magnetic clutch to the mechanism of the gearing subsystem.

2. The system of claim 1, wherein:
the mechanism comprises a gear that includes a magnetic material; and
the magnetic clutch subsystem comprises a magnet configured to resist rotational motion of the gear.

3. The system of claim 1, the magnetic clutch subsystem further comprising:
a clutch control subsystem, communicatively coupled with the magnetic clutch subsystem, and configured to detect when the gearing subsystem is in the unpowered state,
wherein the magnetic clutch subsystem is configured to apply the non-contact magnetic resistive force only when the clutch control subsystem detects that the gearing subsystem is in the unpowered state.

4. The system of claim 1, further comprising:
a clutch control subsystem, communicatively coupled with the magnetic clutch subsystem, and configured to detect when the mass is undergoing Z-directional motion while the gearing subsystem is in the unpowered state,
wherein the magnetic clutch subsystem is configured to apply the non-contact magnetic resistive force only when the clutch control subsystem detects that the mass is undergoing Z-directional motion while the gearing subsystem is in the unpowered state.

5. The system of claim 1, wherein the magnetic clutch subsystem is configured to apply the non-contact magnetic resistive force by increasing the magnitude of the non-contact magnetic resistive force at least until the mass is not undergoing Z-directional motion while the gearing subsystem is in the unpowered state.

6. A drive system comprising:
a gearing subsystem coupled with a mass that is suspended in context of a Z-directional force, the gearing subsystem configured to control Z-directional motion of the mass using a mechanism that has an internal friction force that is insufficient to hold the mass stationary in opposition to the Z-directional force when the gearing subsystem is in an unpowered state; and
a magnetic clutch subsystem configured to apply a non-contact magnetic resistive force directly over an air gap to one or more gears of the gearing subsystem to resist rotational motion of the one or more gears, in such a way that the magnetic resistive force, when added to the internal friction force, is of at least a sufficient magnitude to hold the mass stationary in opposition to the Z-directional force when the gearing subsystem is in the unpowered state wherein the air gap extends from the magnetic clutch to the one or more gears of the gearing subsystem.

7. The drive system of claim 6, wherein:
the gearing subsystem comprises a gear that includes a magnetic material; and
the magnetic clutch subsystem comprises a magnet disposed at a position radially to an axis of the gear so as to leave an air gap between the magnet and the gear.

8. The drive system of claim 7, wherein the magnet is a permanent magnet.

9. The drive system of claim 6, further comprising:
a clutch control subsystem, communicatively coupled with the magnetic clutch subsystem, and configured to detect when the gearing subsystem is in an unpowered state,
wherein the magnetic clutch subsystem is configured to apply the non-contact magnetic resistive force only when the clutch control subsystem detects that the gearing subsystem is in an unpowered state.

10. The drive system of claim 9, wherein:
the clutch control subsystem is further configured to detect when the mass is undergoing Z-directional motion while the gearing subsystem is in the unpowered state; and
the magnetic clutch subsystem is configured to apply the non-contact magnetic resistive force only when the clutch control subsystem detects that the mass is undergoing Z-directional motion while the gearing subsystem is in the unpowered state.

11. The drive system of claim 9, wherein:
the magnetic clutch subsystem comprises an electromagnet; and
the clutch control subsystem is configured to apply the non-contact magnetic resistive force by adjusting power to the electromagnet in response to detecting that the gearing subsystem is in an unpowered state so as to cause the magnetic resistive force to be of at least the sufficient magnitude.

12. The drive system of claim 9, wherein:
the magnetic clutch subsystem comprises a magnet; and
the clutch control subsystem is configured to apply the non-contact magnetic resistive force by adjusting a position of the magnet thereby affecting an air gap between the magnet and a magnetic gear of the gearing subsystem in response to detecting that the gearing subsystem is in an unpowered state so as to cause the magnetic resistive force to be of at least the sufficient magnitude.

13. The drive system of claim 6, further comprising:
a cable delivery subsystem configured to couple the mass with the gearing subsystem in such a way as to allow the mass to hang in context of the Z-directional force on one or more cables.

14. The drive system of claim 6, wherein the Z-directional force is a gravitational force.

15. A method comprising:
controlling Z-directional motion of a mass in context of a Z-directional force acting on the mass using a gearing subsystem having an internal friction force that is insufficient to hold the mass stationary in opposition to the Z-directional force when the gearing subsystem is in an unpowered state; and a magnetic clutch applying a non-contact magnetic resistive force directly over an air gap to the gearing subsystem, the magnetic resistive force, when added to the internal friction force, being of at least a sufficient magnitude to hold the mass stationary in opposition to the Z-directional force when the gearing subsystem is in the unpowered state wherein the air gap extends from the magnetic clutch to the mechanism of the gearing subsystem.

16. The method of claim 15, further comprising:

detecting whether the gearing system is in the unpowered state, wherein the applying the non-contact magnetic resistive force step is performed in response to the detecting step.

17. The method of claim 16, wherein applying the non-contact magnetic resistive force comprises:

adjusting the magnetic resistive force to have a magnitude which, when added to the internal friction force, is at least sufficient to hold the mass against the Z-directional force when the gearing subsystem is in the unpowered state.

18. The method of claim 15, further comprising:

detecting whether the mass is undergoing Z-directional motion while the gearing system is in the unpowered state, wherein the applying the non-contact magnetic resistive force step is performed only when the mass is undergoing Z-directional motion while the gearing subsystem is in the unpowered state.

19. The method of claim 18, wherein applying the non-contact magnetic resistive force comprises:

increasing the magnitude of the magnetic resistive force as experienced by the gearing subsystem at least until the mass is detected to be no longer undergoing Z-directional motion while the gearing subsystem is in the unpowered state.

20. The method of claim 15, wherein:

the gearing subsystem comprises at least one gear that includes magnetic material; and applying the non-contact magnetic resistive force to the gearing subsystem comprises applying the non-contact magnetic resistive to the at least one gear in such a way as to resist rotational motion of the at least one gear.

* * * * *